Feb. 23, 1943.  M. ZAIGER  2,312,279
TELESCOPING WINDSHIELD WIPER ARM
Original Filed Sept. 25, 1941  2 Sheets-Sheet 1
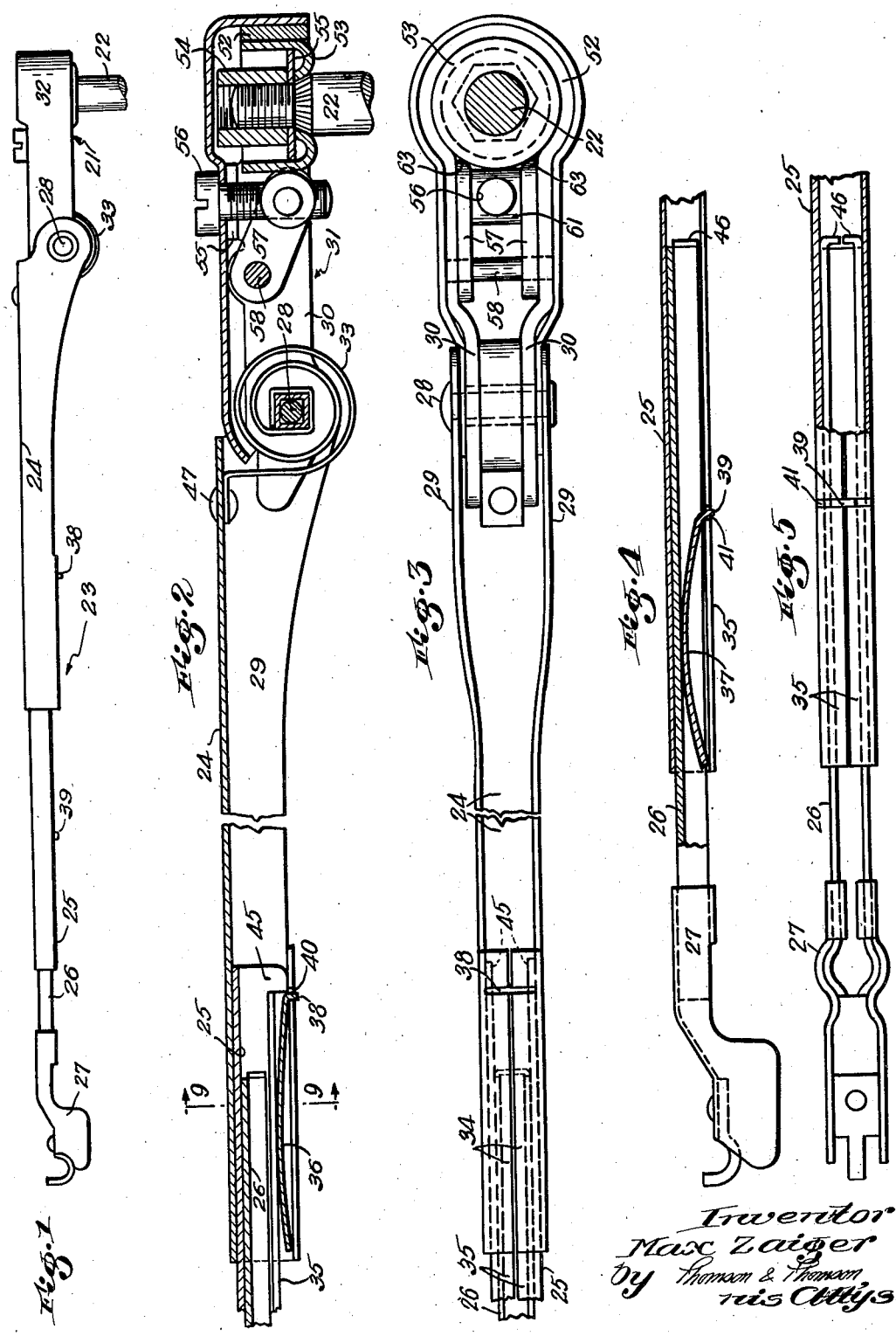
Inventor
Max Zaiger
by Thomson & Thomson
his Attys.

Feb. 23, 1943.   M. ZAIGER   2,312,279
TELESCOPING WINDSHIELD WIPER ARM
Original Filed Sept. 25, 1941   2 Sheets-Sheet 2
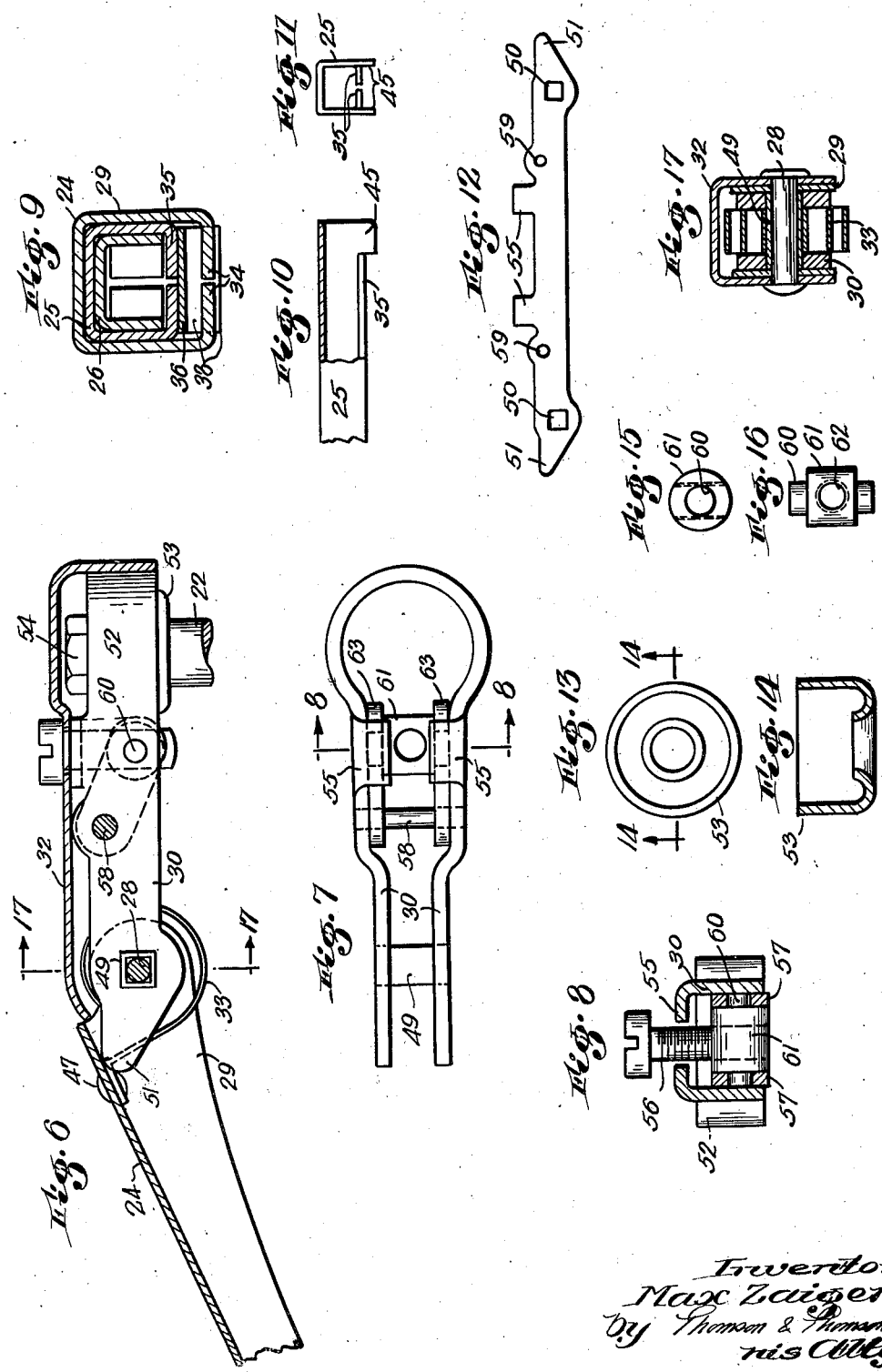
Inventor
Max Zaiger
by Thomson & Thomson
his Attys.

Patented Feb. 23, 1943

2,312,279

UNITED STATES PATENT OFFICE 2,312,279

TELESCOPING WINDSHIELD WIPER ARM

Max Zaiger, Swampscott, Mass.

Original application September 25, 1941, Serial No. 412,269, now Patent No. 2,295,621, dated September 15, 1942. Divided and this application March 12, 1942, Serial No. 434,383

4 Claims. (Cl. 287—53)

This invention relates to telescoping windshield wiper arms and pertains more particularly to improvements in extensible arms of the character disclosed in my Patent No. 2,245,244. This application is a division of my copending application Serial No. 412,269, filed September 25, 1941, now Patent No. 2,295,621, dated September 15, 1942.

The principal purpose of the present invention is to provide a wiper arm having a plurality of telescoping sections equipped with improved means of simple, economical and efficient construction and design, for yieldably maintaining the respective sections in any desired position of longitudinal adjustment, and also for limiting relative movement of the sections in both directions. The improved structural features which thus contribute to simplicity of manufacture and assembly, durability in operation, and ease of adjustment by the user will be hereinafter described and pointed out in the appended claims.

A recommended embodiment of the invention is illustrated in the accompanying drawings, in which:

Fig. 1 is a side view of the improved wiper arm;

Fig. 2 is an enlarged longitudinal section with parts in elevation, of the coupling section and the rearward portion of the telescoping sections;

Fig. 3 is a bottom view of the structure shown in Fig. 2;

Fig. 4 is a view similar to Fig. 2, showing the forward portion of the telescoping sections;

Fig. 5 is a bottom view of Fig. 4;

Fig. 6 is a fragmentary view showing the coupling link in side elevation with its cover cap and pivot pins in section, and a portion of one of the rearmost arm sections in tilted position;

Fig. 7 is a plan view of the coupling member with certain attachments omitted;

Fig. 8 is a section on line 8—8 of Fig. 7, with the clamping screw in place;

Fig. 9 is a section on line 9—9 of Fig. 2;

Fig. 10 is a detail view, partly in longitudinal section and partly in elevation, of the inner end of the intermediate telescoping section shown in Fig. 2;

Fig. 11 is an end view looking to the left of Fig. 10;

Fig. 12 is a plan view, to reduced scale, of a blank preferably used in making the coupling member or clamp housing shown in Fig. 7;

Fig. 13 is a plan view of a bushing located between the clamp housing and the motor shaft;

Fig. 14 is a sectional view of the bushing, taken on line 14—14 of Fig. 13;

Figs. 15 and 16 are end and side views, respectively, of a screw-receiving hub forming part of the clamping mechanism of the coupling section; and Fig. 17 is a sectional view taken on line 17—17 of Fig. 6.

The improved wiper arm comprises a coupling section represented generally at 21 (Fig. 1) and adapted to be secured to the operating shaft 22 of a wiper motor or other actuator; and an outer or extensible portion represented generally at 23 and composed of three mutually telescoping sections 24, 25 and 26 respectively; the forwardmost section 26 being provided with a terminal or end piece 27 to which a wiper blade may be removably connected. The outer or rearmost section 24 of the three telescoping sections is pivoted to the coupling section by a pin 28 extending through overlapping projections of the sides 29 of the channeled section 24 and the sides 30 of a substantially U-shaped metal link or clamp housing 31, respectively (Figs. 2 and 3). A cap or cover 32 which normally encloses the clamp housing and its associated parts is also hinged at the pivot 28; and a clock spring 33, secured substantially in the manner described and claimed in my said copending application Serial No. 392,269, surrounds the pivot and serves to urge the telescoping sections of the wiper arm toward the windshield (Fig. 6) and thus press the wiper blade against the glass during oscillation of the arm.

In accordance with the present invention, each of the three telescoping sections is channel shaped to provide mutually interfitting and slidable top and side walls; and the sides of outer section 24 and intermediate section 25 have inwardly directed flanges providing spaced bottom walls 34 and 35 of the respective sections. The bottom flanges 34 need not extend the full length of the section 24, and are relatively short as shown in Figs. 2 and 3. Section 26 does not require the bottom flanges, but may be provided with them if desired; and section 25 may be made in the form of a tube substantially square in cross-section.

In order to restrain relative longtiudinal movement of the telescoping sections and hold the parts in extended or other adjusted positions, spring members 36 and 37 of similar construction and arrangement are installed in a novel manner between the flat bottom walls of sections 24 and 25 and between the flat bottom wall of section 25 and the flat top of section 26, respectively. Each of these leaf springs is relatively short and bowed, and each is provided at one end with a shouldered anchoring lip preferably received in a complemental slot to hold the spring in operative position. The lip 38 of spring 36 is engaged in aligned slots 40 formed in the bottom flanges 34 of section 24; and the lip 39 of spring 37 is engaged in similar slots 41 formed in the bottom flanges 35 of section 25 (Figs. 2 and 4). It will be apparent, however, that equivalent means may be employed for anchoring each spring against longitudinal movement in both directions; for example, the spring could be formed with a shouldered lip or detent at each end to straddle the entire length of the bottom wall to which it is applied, thereby avoiding the necessity of a special slot.

The end portions of spring 36 thus bear on the bottom wall of the outer section 24, while the center of the spring bears on the bottom wall of the intermediate section 25 (Figs. 2 and 9); and the end portions of spring 37 bear on the opposite side of the bottom walls of the intermediate section, while the center of that spring bears on the under side of the top wall of the inner section 26 (Fig. 4). This arrangement is most effective in accomplishing the purpose of the spring members, and it will be apparent that the two springs are interchangeable and of relatively small size, so that they may be produced and assembled with economy and ease and do not unduly increase the weight of the completed arm as contrasted with the springs heretofore employed or shown in my aforesaid application.

In order to limit relative movement of the telescoping sections and prevent accidental separation thereof, improved stop members are provided. Forward movement of the intermediate section 25 is limited by stop ears 45 constituting downward extensions of the side walls of said section at the rearward end thereof, said ears engaging the shoulder of the spring lip 38, as indicated in Fig. 2, when the intermediate section is pulled to its extreme forward position. Forward movement of the inner section 26 is similarly limited by stop ears 46 preferably bent inwardly from the sides of said section at the rearward end thereof and engageable with the shoulder of the spring lip 39, as will be apparent from Fig. 4.

It will thus be observed that forward or outward movement of said sections is controlled by the spring members which are readily insertable into operative position after the telescoping sections are assembled, so that the springs serve a double purpose in a simple yet efficient manner.

Although the control of rearward or inward movement of these sections is not so critical or important, it will be evident that rearward movement of section 25 is limited by the engagement of the end of said section with the end of the clock spring 33 which is fastened to the top of section 24 by a rivet 47 (Fig. 2); and that rearward movement of section 26 is limited by engagement of the rear edge of the end piece 27 with the forward edge of section 25 (Fig. 4).

The length of these sections is such that they may be telescoped together so that all of sections 25 and 26 (except the terminal 27) are contained within section 24 when the wiper arm is closed, and may be extended to a very substantial extent when sections 25 and 26 are drawn forward to their limit of movement. The arm is thus adapted for use on all sizes of windshields, and it will be understood that the wiper blade attached to the end piece 27 may be of adequate length to clean a substantial area of the windshield. It will also be understood that the end piece may be mounted for pivotal movement, as disclosed in my Patent No. 2,245,244 or my said copending application.

As more fully explained in my said copending application, one end of the clock spring 33 is secured to a sleeve or tube 49 of square or other polygonal cross-section, at least at its ends which are engaged in complemental, polygonal openings 50 (Fig. 12) in the sides 30 of the clamp housing 31. The sleeve is fitted over the pivot 28, and serves to hold the inner end of the clock spring stationary with respect to the clamp housing; the opposite end of the spring being fastened to arm section 24 by the rivet 47 or otherwise, so that said arm section is constantly urged toward the windshield as aforesaid. The forward ends 51 of sides 30 project into the channel of section 24 and serve to limit such movement, as indicated in Fig. 6, as disclosed in my aforesaid application; and the tension of the clock spring may be adjusted, if desired, as therein explained.

The U-shaped clamp housing 31 is formed with a sleeve or end portion 52 adapted to receive a bushing 53 or other collar member placed over the reduced end of motor shaft 22 or forming part of the shaft end, the bushing being secured thereon by a nut 54 bearing against a washer 55 which is seated in the hollow bushing herein illustrated (Fig. 2). Bushing 53 is preferably stamped from sheet stock to provide a tubular collar and an inturned base flange of rounded contour (Figs. 13 and 14) which engages a tapering and preferably knurled shoulder of the motor shaft and thus prevents rotation of the bushing relative to the shaft when the nut 54 is tightened; and the edge of the annular flanges forms a seat for the washer received in the bushing. The collar portion of the bushing 53 fits loosely in the rounded end portion 52 of the coupling link, until said end portion is clamped on the bushing by the improved clamping mechanism now to be described.

The sides of the housing 31 are provided with inwardly directed tabs 55, the opposed ends of which are spaced from each other. These tabs serve as a seat for the cover cap 32 and as a bearing for the head of a clamping screw 56 which passes through an enlarged opening in the cover and between said tabs.

A pair of spaced levers or pawls 57 are pivoted between the sides 30 by a pin 58 the ends of which are received in holes 59 of said sides; and a stub shaft 60 having a hub or trunnion 61 disposed between the levers 57, is journaled in said levers near their movable ends which are normally in engagement with the collar portion of the bushing 53 (Fig. 3). The hub 61 has a diametrical, threaded opening 62 in which the screw 56 is operatively engaged, so that the pawls 57 will be moved relative to the clamp housing and the bushing therein received when the screw head is turned.

As the distance from the pivot 58 to the operative ends 63 of the respective pawls is greater than the distance between said pivot and the points of engagement of said ends on the bushing or collar 53, the pawls act in the manner of a cam or toggle when the screw 56 is tightened in the hub 61, thereby securely clamping the bushing between the lever ends and the sleeve portion 52 of the coupling link and binding said link to the motor shaft. This action also locks the cap against the ears 55 of the link, as aforesaid.

It will be apparent that the clamp may easily be loosened and released from the operating shaft 22 and its collar 53 by unscrewing the clamping screw while pressing downwardly on its head. It will also be evident that the improved clamping mechanism would be equally effective with other types of bushings or shaft ends; and it will be understood that the structural details of the apparatus herein illustrated or described may be varied to suit particular conditions without departing from the essence of my invention as defined in the appended claims. For example, the forwardmost section 26 need not be formed with side walls, for a flat strip of metal will serve the purpose and a stop flange, corresponding in function to the ears 46, may be bent downwardly at the inner end of such flat strip.

I claim:

1. A windshield wiper arm comprising at least two telescoping sections slidable relative to each other so that the sections may be closed together or extended to a variety of adjusted positions, the outer of said sections having side and bottom walls, a leaf spring operatively disposed between the two sections, and means on said spring engageable with said bottom wall to hold the spring in operative position for restraining relative longitudinal movement of said sections, the inner of said sections having a projection engageable with the rearward end portion of said spring to limit forward movement of said section.

2. A windshield wiper arm comprising at least two telescoping sections each having top and side walls in slidable engagement so that the sections may be closed together or extended to a variety of adjusted positions, the outer of said sections having a bottom wall provided with a transverse slot, and a leaf spring operatively disposed between the two sections and having a lip engaging in said slot to hold the spring in operative position for restraining relative longitudinal movement of said sections.

3. A windshield wiper arm comprising at least two telescoping sections each having top, side and bottom walls, the top and side walls of the respective sections having sliding engagement so that the sections may be closed together or extended to a variety of adjusted positions, the respective bottom walls being spaced from each other and the bottom wall of the outer section having a slot therein, and a leaf spring operatively disposed between the bottom walls of the two sections and having an end lip engaging in said slot to hold the spring in operative position for restraining relative longitudinal movement of said sections.

4. A windshield wiper arm comprising at least two telescoping sections each having top and side walls in slidable engagement so that the sections may be closed together or extended to a variety of adjusted positions, the outer of said sections having a bottom wall provided with a transverse slot, and a leaf spring operatively disposed between the two sections and having a lip at its rearward end engaging in said slot to hold the spring in operative position for restraining relative longitudinal movement of said sections, the spring having a shoulder adjacent said lip and the inner of said sections having a projection engageable with said shoulder to limit forward movement of said section.

MAX ZAIGER.